United States Patent Office 3,702,219
Patented Nov. 7, 1972

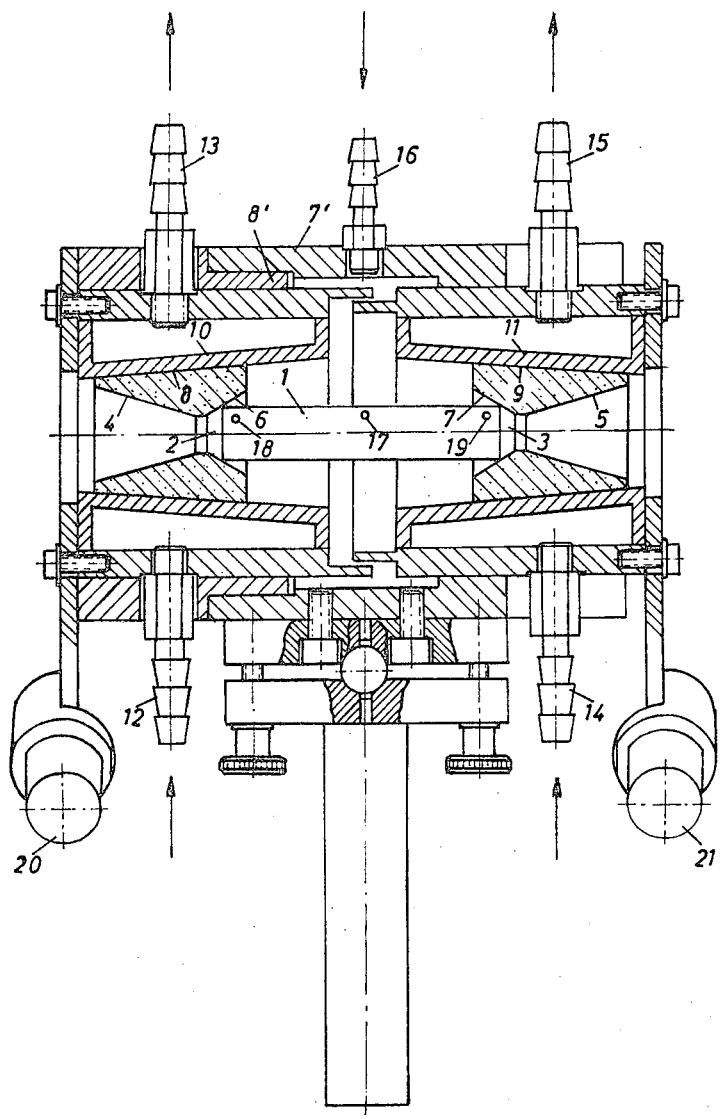

3,702,219
GRAPHITE TUBE CELL ASSEMBLIES FOR ATOMIC ABSORPTION SPECTROMETERS
Klaus Braun and Kurt Manthey, Überlingen, and Bernhard Welz, Meersburg, Germany, assignors to Bodenseewerk Perkin-Elmer & Co., GmbH, Überlingen am Bodensee, Germany
Filed Feb. 5, 1971, Ser. No. 112,855
Claims priority, application Germany, Feb. 11, 1970, P 20 06 032.6
Int. Cl. G01j *3/30;* G01n *21/16*
U.S. Cl. 356—244
3 Claims

ABSTRACT OF THE DISCLOSURE

A known type of heated sample cell assembly for atomic absorption spectroscopy includes an open-ended graphite sample tube having a central hole for initially introducing the sample into the tube and for allowing an inert gas to circulate from the otherwise closed housing into the tube to protect the interior surfaces from oxidization when the device is heated, as by large electrical currents supplied from electrodes in contact with both ends of the graphite tube. The present improvement includes the addition of two further holes near the ends of the graphite tube to reduce the speed at which a given total protective gas flow causes the same amount of sample to be expelled from the open end of the tube, thereby increasing useful measuring time. Preferably the end holes are offset so as to cause the gas flow entering the interior to be substantially tangential to the inner walls of the tube so as to form a helical or cyclonic flow along these walls, thereby minimizing the possibility of ambient air flow reaching these inner wall surfaces. Advantageously, the graphite tube may have conically tapered ends, and the (also graphite) electrodes may be annular and include complementarily conically-shaped inner surfaces mating with these conical ends of the tube.

GENERAL DESCRIPTION

This invention relates to a heated sample cell for atomic absorption spectrometers, comprising a graphite tube which is mounted in a housing between two electrodes for the supply of a large heating current and has a hole in the generatrix of the tube (i.e., the tubular surface) in a central area, and further comprising a connection for introduction of a protective (i.e., inert) gas into the housing.

Because of the high current supplied to the graphite tube through the electrodes, the graphite tube can be caused to assume a very high temperature of the order of 2000° C. (3632° F.). Prior to this heating, a sample substance under analysis is introduced into the graphite tube through the hole in the central area. This sample substance is atomized at the subsequently attained high temperature, so that an atomic vapor of the sample substance is produced within the graphite tube. The measuring ("sample") beam of rays of an atomic absorption spectrometer is passed through the graphite tube along its longitudinal direction, the measuring beam of rays originating, for instance, from a hollow cathode lamp and containing spectral lines of the tested-for element of interest. From the attenuation of this measuring beam of rays it is possible to determine the amount of the tested-for substance of interest in the sample. The purpose of the protective gas is to avoid burning of the graphite tube at the high temperatures involved. As protective gas an inert gas, for instance, nitrogen may be used. This protective gas circulates around the graphite tube from the outside. It enters through the hole in the central area into the interior of the graphite tube so that the protective gas circulates about all sides (i.e., surfaces) of the graphite tube, and admission of fresh air is thus precluded. The protective gas escapes from the open ends of the graphite tube.

In prior graphite tube cells of this type, the flow of protective gas has the disadvantageous effect that it "rinses" (i.e., carries away) the sample vapor out of the graphite tube relatively rapidly, whereby the available sample measuring time is reduced.

It is an object of this invention to extend the measuring time available for a given sample volume (i.e., quantity) in graphite tube cells of the type indicated hereinbefore.

It is a more specific object of this invention to avoid a "rinsing out" or carrying away of the sample vapor from the graphite tube of such a cell to a large extent.

According to the invention this object is attained by providing that the graphite tube has further holes in the tubular generatrix (i.e., the cylindrical wall) in the area of the ends of the graphite tube. Thereby, instead of the total flow of protective gas passing into the graphite tube through the central hole and then flowing through the interior of the graphite tube to the two ends thereof and being discharged from there, rather a parallel flow is also produced passing along the outside of the graphite tube and then into the end holes. In this manner flow conditions can be provided such that the sample vapor is retained in the interior of the graphite tube and (therefore is available for measurement) for a longer time than with the prior arrangements.

Advantageously, each of the ends of the graphite tube tapers conically (inwardly) and each conical end portion is mounted between complementarily conical surfaces of one of a pair of facing, generally annular (i.e., ring-shaped) electrodes, which electrodes are arranged coaxially with respect to the tube and may also consist of graphite. Because of the flow of the protective gas discharged at both ends of the graphite tube, which also passes across the adjacent surfaces of the electrodes, the latter are maintained in a protective gas atmosphere, and burning of the electrodes is avoided (even though the electrodes may be graphite).

First, tests were run in which the holes in the area of the ends of the graphite tube were provided by radial bores (i.e., holes through the tubular wall directly toward the axis of the tube). The flow of protective gas was intended to be as weak as was practical. This rate of flow is primarily important from two aspects:

(1) A generally too low rate of gas flow (so that the resulting gas velocity measured across the inside diameter of the graphite tube is, for example, at least of the same order of magnitude as the inevitable air movement of the environment due to draft) may vary or drift to such an extent that one respective end (facing such a draft) of the graphite tube is subjected to entering of and therefore the influence of ambient air and is rapidly destroyed.

(2) An unnecessarily great flow rate, although of course ensuring a safe circulation of the gas around all parts of the graphite tube cell to be protected against burning, very rapidly expels the sample vapor, because of its partial flow passing through the central inlet bore (and out both ends of the tube).

When such radial bores are utilized, the protective gas passing radially therethrough immediately separates from the interior walls of the graphite tube to randomly mix in a tubulent flow with one or more similar gas flows approximately along the axis of the tube.

Actual life tests have shown that this radial movement of the gas flows may lead to undesired losses by burning in the vicinity of the bores, since the inevitable edge turbulence of these flows causes movement of further gas from the vicinity. In the particular area of the total (i.e., maximum) flow this effect occurs to such an extent that small amounts of fresh air are drawn into the interior of the tube from the environment, the oxygen content of which causes the burning loss (of the graphite).

It is another object of this invention to so guide the flow of protective gas by a suitable arrangement of the auxiliary bores (adjacent the ends of the tube) that an improved stability against draft is achieved.

According to the invention this object is attained by providing that the two holes in the area of the respective ends of the graphite tube are formed by bores extending secantially or almost tangentially to the tube cross-section (that is, almost tangentially to the interior wall surface defining the tubular open interior of the tube) whereby they cause a flow of protective gas extending cyclonically (i.e., as a helical flow) along the inner wall of the graphite tube. Such a cyclonic or helical flow tends to closely follow the surface of the internal walls of the graphite tube cell, and consequently, has a substantial stability with respect to draft, so that it is capable of reliably protecting the (inner) walls of the tube from the influence of fresh air, even for low flow velocities of the protective gas. The holes at both ends should be offset in the same (lateral) direction in order that cyclone-type (i.e., helical) flow is produced in the same (rotational) direction inside of the graphite tube cell across the total length thereof.

The effectiveness of this bore arrangement was tested on several graphite tubes. The results obtained indicate that a substantial increase (up to six times longer) in life of the graphite tube cells is effected, the life being practically limited only in general by the life of the tube in its central hottest zone. Such graphite tubes which were run in actual life tests until destruction did not show any substantial loss because of burning phenomena at their ends.

An illustrative embodiment of this invention will now be described in greater detail with reference to the accompanying drawing, in which:

The sole figure is a longitudinal section through a graphite tube cell according to the invention.

A hollow cylindrical graphite tube 1 is conically tapered at its ends, as at 2 and 3. By means of these conical ends 2 and 3 the graphite tube 1 is mounted by contact with two electrodes 4 and 5, which are provided with complementarily conical surfaces 6 and 7, respectively. The electrodes 4 and 5 are also made from graphite. They are generally annularly shaped and each is arranged co-axially with respect to the graphite tube 1 (i.e., the axis of each ring-shaped electrode 6 and 7 is coincident with the longitudinal axis [horizontal in the drawing] of the graphite tube). The external surfaces 8 and 9, respectively, of the electrodes are also slightly conical in such a manner that the outside diameter of each of the electrodes 4 and 5 at the end remote from the graphite tube 1 is smaller than the outside diameter in the area generally surrounding (the ends) of the graphite tube.

The electrodes 4, 5 are surrounded by cooling jackets 10, 11 which have complementarily (slightly tapering) conical internal surfaces. Thus, the electrodes are in firm mating relationship with the cooling jackets 10, 11, so that the electrical and thermal transfer resistances between the electrodes 4, 5 and the respective cooling jackets 10 and 11 are kept small. The cooling jackets 10 and 11 extend inwardly beyond the electrodes 4 and 5, respectively, in the (longitudinal) axial direction, so that the graphite tube 1 is substantially surrounded by the cooling jackets 10, 11. The cooling jackets 10, 11 are mounted in one housing part 7' and 8', respectively.

Through a central connection 16 a protective gas is supplied to all parts inside the housing. This protective gas flows through an opening 17 in the central area of the graphite tube 1 into the interior thereof. A protective gas flow parallel thereto circulates around the graphite tube 1 on the outside thereof and enters through openings 18, 19 in the area of the ends of the graphite tube. Both flows (through the central and end holes) of protective gas then discharge at the ends of the graphite tube and also circulate along the surfaces of the electrodes 4 and 5. In this manner, the electrodes and the graphite tube are protected from burning, when a heavy current is supplied to the electrodes 4, 5 and the graphite tube 1 to heat both to a high temperature through heavy-current plug-conductors 20, 21.

A sample may be introduced into the graphite tube 1 through the opening 17 which in general would have its bore axis radial (i.e., perpendicular to the tangent to the cylindrical walls) relative to the tube. When the graphite tube 1 is heated up and may assume a temperature of the order of 2000° C. (3632° F.), a dissociation of the sample into its atoms is effected. The radiation absorption is measured in the conventional manner at a resonant wavelength of the element of interest. By providing that the protective gas not only flows through the central opening 17, but that a similar flow enters through the openings 18 and 19 near the ends of the tube 1, the atomized sample vapor in the interior of the tube is "rinsed" out (i.e., carried out) by the protective gas to a lesser extent than if the same total amount of gas all entered the central opening. Therefore, longer measuring times can be attained for a given sample volume than with prior graphite tube cells which only have a central aperture corresponding to the aperture 17 (and the same degree of protection by a similar total protective gas flow rate).

The openings or bores 18, 19, as may be seen from the drawing, are offset laterally with respect to the center axis of the graphite tube 1 with both being on the same side, and they extend secantially (in fact, almost tangentially) to the interior of the tube as seen in cross-section. Thereby a helical or cyclone-type flow of protective gas passing along the internal walls of the graphite tube 1 is caused which, as previously described, exhibits better stability against draft. Thus, air current movements tending to enter the open ends of electrodes 4 and 5 and the open ends 2, 3 of the graphite tube 1 itself generally do not upset this surface flow of the protective gas, and therefore the air does not reach the graphite surfaces.

It is claimed:

1. In a heated sample cell assembly for atomic absorption spectrometers of the type including: an elongated graphite tube mounted in a surrounding housing between two electrodes which supply a large heating current to the ends thereof, the tube comprising a hollow tubular wall defining the volume into which the sample is introduced and having a hole extending generally radially through the tubular wall in a central area thereof for introduction of the sample, said assembly including a connection for introduction of a protective gas into the housing, the improvement comprising:
   means defining additional holes extending through said tubular wall adjacent to both ends of said graphite tube.

2. An improved cell assembly as claimed in the claim 1, in which:
   said graphite tube further comprises conically tapering ends;
   and both of said electrodes are composed of graphite, are of generally annular shape arranged coaxially with respect to the longitudinal axis of said elongated tube, and comprise complementarily shaped conical surfaces mating with said conical ends of said tube.

3. An improved cell assembly as claimed in the claim 1, further comprising:
   said means defining said additional holes adjacent to the ends of said graphite tube further defining said holes as bores extending secantially or almost tangentially to the interior of said tubular wall as viewed in a cross-sectional plane perpendicular to the longitudinal axis of said tube;

whereby the flow of protective gas entering the interior of said tube through said additional holes enters along the interior surface of said tubular wall of said graphite tube and tends to flow along said interior surface of said wall in a helical or cyclonic manner.

References Cited

UNITED STATES PATENTS

| | | | |
|---|---|---|---|
| 2,810,315 | 10/1957 | Miller | 356—246 |
| 3,508,804 | 4/1970 | Müller | 356—246 X |
| 3,520,517 | 7/1970 | Hrdina | 356—246 |

OTHER REFERENCES

Cann, Rev. Sci. Inst., vol. 40, No. 4, April 1969, pp. 599–596.

West et al.: Anal. Chim. Acta, vol. 45, 1969, pp. 27–41 (Atomic Abs. Spec. Digest).

Manning et al: Atomic Absorption Newsletter, vol. 9, No. 3 (May–June 1970), pp. 65–70.

RONALD L. WIBERT, Primary Examiner

V. P. McGRAW, Assistant Examiner

U.S. Cl. X.R.

356—85, 87